US007262747B2

(12) United States Patent
Ebersole et al.

(10) Patent No.: US 7,262,747 B2
(45) Date of Patent: Aug. 28, 2007

(54) METHOD AND APPARATUS FOR USING THERMAL IMAGING AND AUGMENTED REALITY

(75) Inventors: John Franklin Ebersole, Bedford, NH (US); Andrew Wesley Hobgood, Nashua, NH (US); John Franklin Ebersole, Jr., Bedford, NH (US)

(73) Assignee: Information Decision Technologies, LLC, Bedford, NH (US)

( * ) Notice: Subject to any disclaimer, the term of this patent is extended or adjusted under 35 U.S.C. 154(b) by 0 days.

(21) Appl. No.: 11/382,978

(22) Filed: May 12, 2006

(65) Prior Publication Data

US 2006/0232499 A1    Oct. 19, 2006

Related U.S. Application Data

(63) Continuation-in-part of application No. 11/092,083, filed on Mar. 29, 2005, now Pat. No. 7,046,214, and a continuation-in-part of application No. 11/092,007, filed on Mar. 29, 2005, now Pat. No. 7,071,898, and a continuation-in-part of application No. 09/927,043, filed on Aug. 9, 2001, now Pat. No. 7,110,013, and a continuation-in-part of application No. 10/213,392, filed on Aug. 6, 2002, now Pat. No. 7,057,582.

(60) Provisional application No. 60/681,746, filed on May 17, 2005.

(51) Int. Cl.
*G09G 5/00* (2006.01)
(52) U.S. Cl. .................................. 345/7; 345/8; 345/9
(58) Field of Classification Search ................ 345/4–9; 359/13, 465, 630–635; 349/11–15, 59
See application file for complete search history.

(56) References Cited

U.S. PATENT DOCUMENTS

| 5,412,569 | A | * | 5/1995 | Corby et al. | .................... 701/2 |
| 5,550,758 | A | * | 8/1996 | Corby et al. | ................. 702/150 |
| 5,745,387 | A | * | 4/1998 | Corby et al. | .................... 703/1 |
| 2001/0049837 | A1 | * | 12/2001 | Slack | .............................. 2/6.2 |
| 2002/0053101 | A1 | * | 5/2002 | Slack | ................................. 2/7 |

* cited by examiner

*Primary Examiner*—Vijay Shankar
(74) *Attorney, Agent, or Firm*—Brian M. Dingman; Mirick, O'Connell, DeMallie & Lougee, LLP

(57) ABSTRACT

A method for using Augmented Reality (AR), in conjunction with a real or simulated thermal imager. A primary application is to train emergency first responders. Particularly, the system uses a thermal imaging camera or standard video camera, and tracking system to provide a tracked viewpoint in an AR environment. The augmented portions of the environment can consist of fire, smoke, extinguishing agent, or other emergencies. This allows for inexpensive, flexible, and realistic on-site training of fire fighting, damage control, search and rescue, and other first responder techniques using thermal imaging.

24 Claims, 5 Drawing Sheets

METHOD AND APPARATUS FOR USING THERMAL IMAGING AND AUGMENTED REALITY

CROSS REFERENCE TO RELATED APPLICATIONS

This application claims priority of Provisional patent application 60/681,746 filed May 17, 2005; "Method and Apparatus for Training with Thermal Imaging and Augmented Reality." This application is a continuation in part of patent application Ser. No. 11/092,083, filed on Mar. 29, 2005 now U.S. Pat. No. 7,046,214; "Method and System for Accomplishing a Scalable, Multi-User, Extended Range, Distributed, Augmented Reality Environment." This application is a continuation in part of patent application Ser. No. 11/092,007, filed on Mar. 29, 2005 now U.S. Pat. No. 7,071,898; "Method for Using a Wireless Motorized Camera Mount for Tracking in Augmented Reality." This application is a continuation in part of patent application Ser. No. 09/927,043, filed on Aug. 9, 2001 now U.S. Pat. No. 7,110,013; "Augmented Reality Display Integrated with Self-Contained Breathing Apparatus." This application is a continuation in part of patent application Ser. No. 10/213,392, filed on Aug. 6, 2002 now U.S. Pat. No. 7,057,582; "A Ruggedized Instrumented Firefighter's Self-Contained Breathing Apparatus."

FIELD OF THE INVENTION

This invention relates to computer graphics, augmented reality, firefighting, first responder training, and thermal imaging. It defines a way to train first responder personnel by augmenting imagery with a graphical thermal representation of a fire, smoke, extinguishing agent, or other emergency or hazard in order to facilitate training of fire fighting and extinguishing, damage control, hazardous material detection and mitigation, search and rescue, incident command, and other first responder techniques.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

This invention can be used any time a user needs to "see" an otherwise invisible object placed within the setting in which it would normally appear, and in this case, onto a video stream. This form of image "augmentation" is known as augmented reality (AR). When a video camera, as opposed to a see-through setup (as might be done with partial mirrors) is used to capture the real scene, the result is considered video-based AR. A video-based AR setup has only a few basic components, including (1) a camera with a known field of view (FOV), (2) a method to determine the position and orientation of the camera, and (3) a computer that creates computer-generated virtual objects that correspond to what the camera is seeing by using the previous two components.

Typically, one of the physically largest components is the second one, wherein a tracking system is used to determine the position and orientation of the camera. A common method known in the art would use an external tracking system available from a company like InterSense (Burlington, Mass.), where the tracking system is made of two main parts. One part is a relatively substantial device that attaches to the camera, and the other part is a detection system that must be supported in place above the camera, usually by at least a few feet. While it has the advantage of being able to detect translational motion in addition to orientation, its size limits its utility.

SUMMARY OF THE INVENTION

This invention facilitates the blending of computer-generated (virtual) graphical elements (which represent real world objects) with the real-world view of the user as seen through a thermal imaging camera. The actual (operational) thermal imaging camera has been specially instrumented with a removable device, which can determine the position and orientation of the thermal imaging camera. Virtual (computer-generated) imagery, such as fire and smoke, can then be placed in an appropriate location and viewed through the thermal imaging camera display. Superimposing virtual imagery onto a real world scene (which may be static or changing) and presenting the combined image as the "replacement" for the real world image is known as Augmented Reality (AR). The location and properties of the computer-generated graphical elements are known and may be input via a human or other means. The user's real world scene/image might consist of scenery that the user can normally see.

The user may visualize the combined virtual and real image using the traditional thermal imaging camera display, or in another embodiment of the invention, the user may view the combined image through a Self-Contained Breathing Apparatus (SCBA), possibly with a simulated thermal camera as the source image of the real world (most easily accomplished with a standard TV camera, and processing the image). In any case, a thermal representation of the real image (e.g., an office space with cabinets and desks) will be shown, overlaid with computer-generated graphical elements drawn to simulate their appearance as if they were really being observed by a thermal camera. The net result is an augmented reality. The invention includes use of a motorized camera to achieve tracking for augmented reality. The invention includes the user wearing most or all of the invention equipment, permitting the user to be self-contained.

This invention features a method for using thermal imaging and augmented reality, comprising providing an imaging device to acquire an image of the user's environment; providing a tracking system attached to the device; using the tracking system to collect the position and orientation of the device; providing a computer; using the device to capture a view of the environment to be augmented; sending the view to a video capture device connected to the computer; using the computer to compute and render a simulated thermal image of objects and features to be augmented onto the view of the environment; combining the simulated thermal image of the objects and features with the image of the real world to display a single, augmented view to the user that represents an augmented thermal view of the real world; displaying the single, final, augmented view to the user.

The device used to capture the image of the real world is preferably a portable thermal imaging camera. The portable imaging camera may be an ISG Talisman K-90XL, or an ISG K-1000, or any model of portable thermal imaging camera from any other vendor. The device used to capture the image of the real world may alternatively be a visible camera. The device used to capture the image of the real world can be a thermal imaging device attached to a firefighter's SCBA.

The tracking system may be ultrasonic/inertial, such as InterSense IS-900, or optical, such as InterSense IS-1200 or $3^{rd}$ Tech Hi Ball, or may be comprised of GPS-based trackers. The tracking system may be comprised of markerless trackers, or may be comprised of motorized camera mount trackers.

The single, augmented view may be used for training. The single, augmented view may comprise thermal signatures of victims, hot spots, fire, smoke, steam, gases, extinguishing agents, other first responders and personnel, signals of impending structural failure, and explosion hazards (such as munitions or chemical drums). In this case, the single, augmented view may be used for training firefighters and other first responders for almost any thermally detectable hazard scenario.

The objects and features may comprise thermal signatures of equipment, structures, vehicles, personnel, and indications of activity, victims, hot spots, fire, smoke, steam, gases, extinguishing agents, other first responders and personnel, signals of impending structural failure, and/or explosion hazards. In this case, the single, augmented view may be used for training military personnel, or for training law enforcement personnel, or for training surveillance personnel.

The purpose may be training for the evaluation of thermal stealth designs in the field, or operational evaluation of thermal stealth designs in the field. The tracking system may be a subcomponent of a motorized camera base such that the motorized camera has knowledge of the orientation of where the camera is pointing at any given time, and can provide the orientation information of the camera to the computer. The view that is sent from the imaging device to the video capture device may be sent via a wireless transmitter and received by a wireless receiver. The tracking system attached to the device may be wireless, or minimally wired and not require any cables to be run from the tracking system to any fixed location. At least the computer may be carried by the user.

DETAILED DESCRIPTION OF THE PREFERRED EMBODIMENTS OF THE INVENTION

Figure 1:
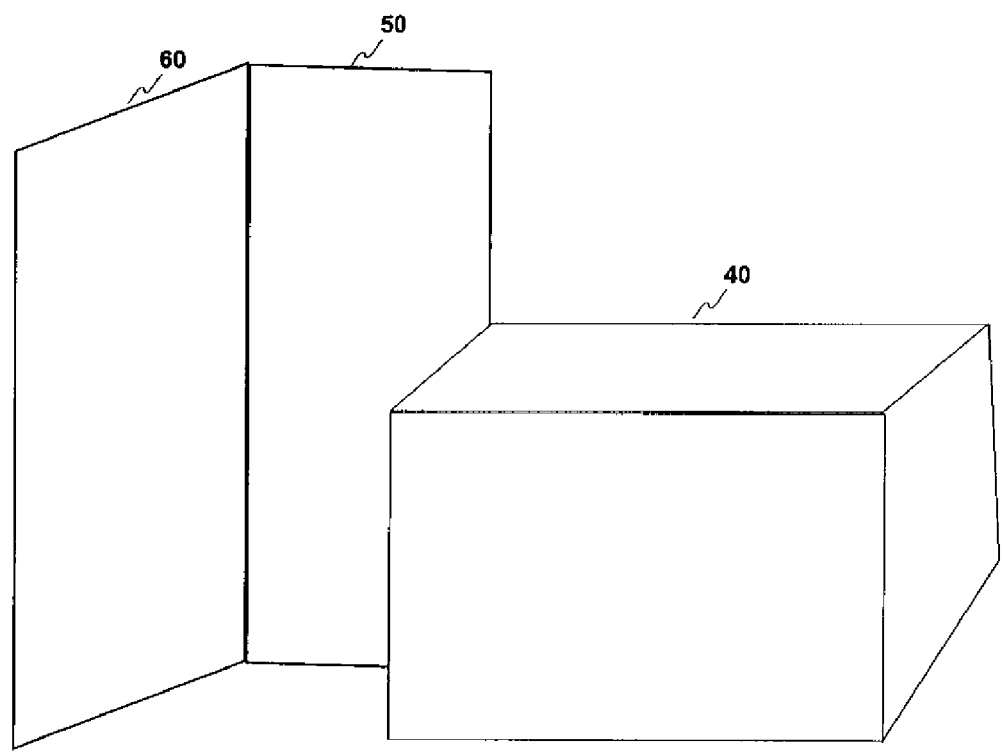
FIG. 1 schematically depicts a real-world (non-augmented) thermal image captured directly from the thermal imaging camera.
Figure 2:
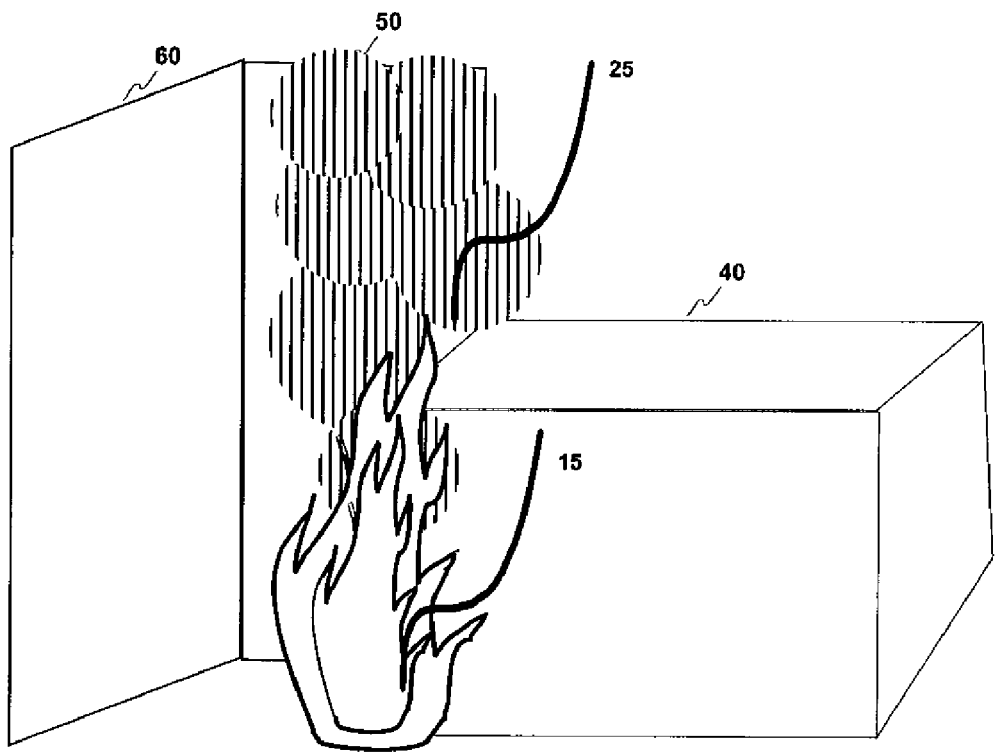
FIG. 2 schematically depicts an augmented reality display where the real-world thermal image in FIG. 1 is combined with simulated fire and smoke and presented as a single, combined image.

In the preferred embodiment of the invention, an image is acquired with an actual (operational) thermal imaging camera (such as the ISG Talisman K-90XL or the ISG K-1000). FIG. 1 represents an image captured from a thermal imaging camera that contains the view of an office, including multiple walls 50 and 60 and a desk 40. The captured image is then processed and displayed by the apparatus of the invention with a thermal view of the real scene augmented with a simulated thermal view of the fire and smoke injected into the scene, along with any applicable extinguishing agent (for example, water or foam). FIG. 2 shows the completed augmented view of FIG. 1, with simulated fire 15 and smoke 25. Since the fire and smoke are hot, they will appear as bright white in the thermal image. Additionally, most types of smoke are either completely or mostly transparent or translucent to thermal imaging cameras, and would be displayed accordingly.

Figure 3:
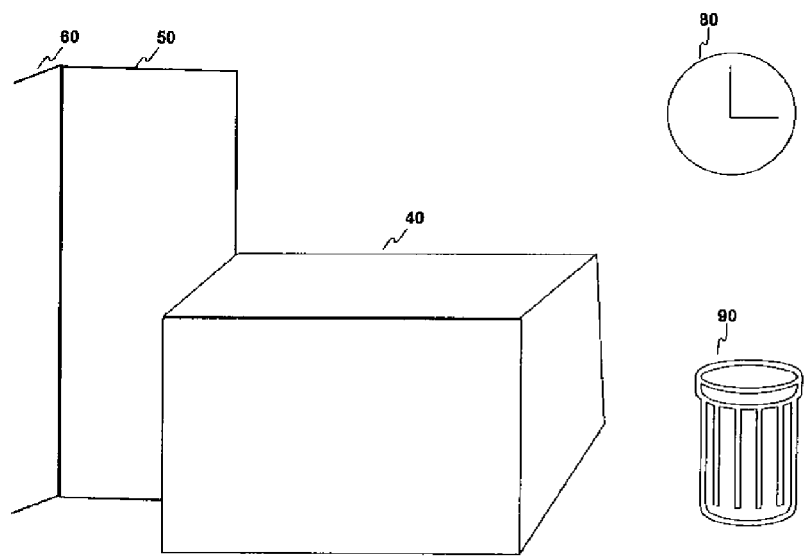
FIG. 3 is the same non-augmented scene from FIG. 1 but from a different camera angle.
Figure 4:
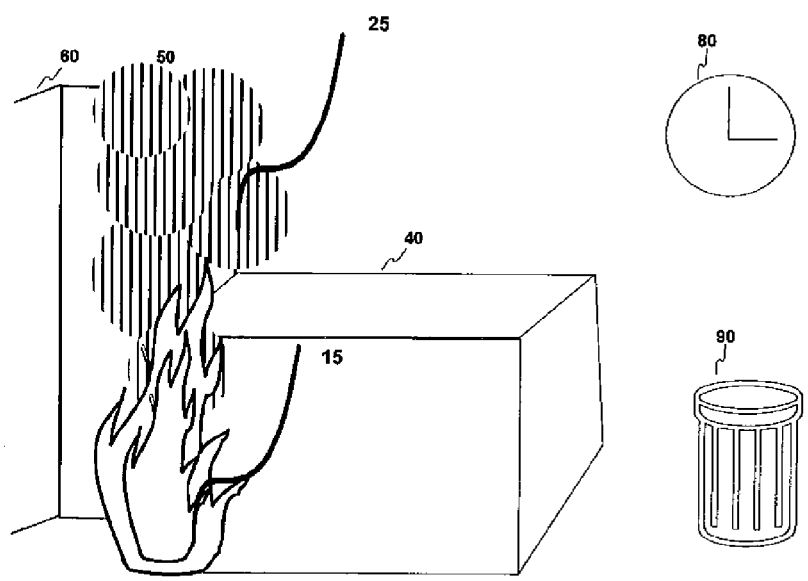
FIG. 4 schematically depicts an augmented reality display where the real-world thermal image in FIG. 3 is combined with simulated fire and smoke and presented as a single, combined image. Note that the fire and smoke remain anchored to the real-world thermal image.

The simulated fire 15 and smoke 25 remain will remain anchored to their calculated positions in the world at all times. FIG. 3 shows the same scene as FIG. 1 (complete with walls 50 and 60, and desk 40), but from a slightly different angle, as shown by the inclusion of a clock 80 and wastebasket 90. FIG. 4 shows the same augmented scene as FIG. 2, also from a slightly different angle, illustrating how the simulated fire 15 and smoke 25 remain anchored to the same locations in the environment.

Figure 5:
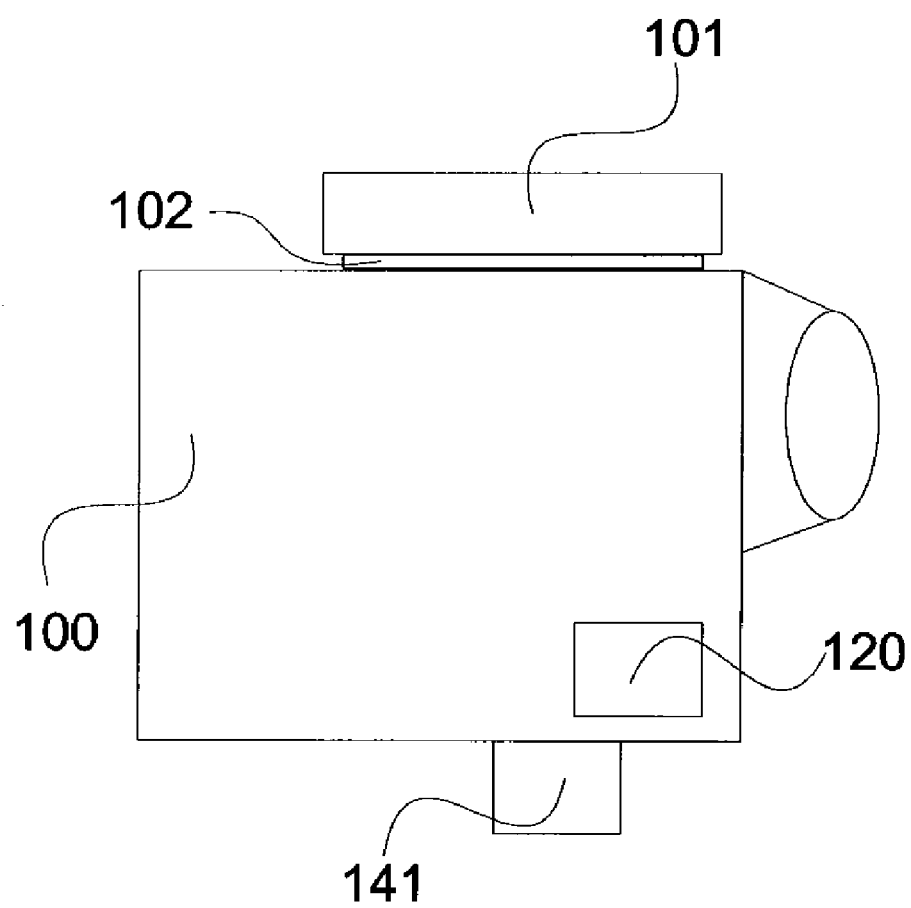
FIG. 5 depicts an AR-instrumented thermal imaging camera.
Figure 6:
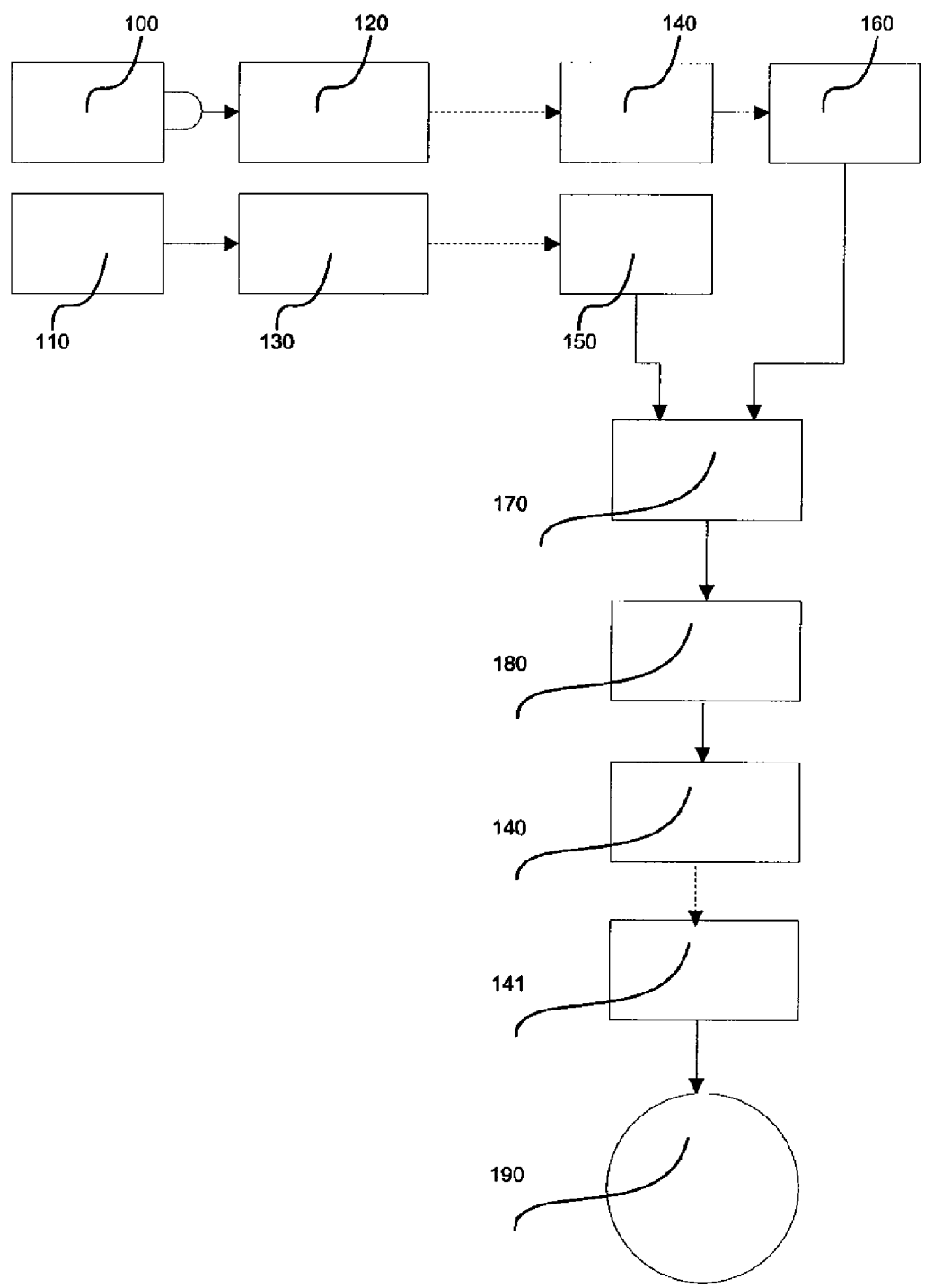
FIG. 6 is a block diagram of the flow of video and data in the above apparatus.

FIG. 5 shows the apparatus to augment the thermal image with the simulated fire and smoke. A thermal imaging camera 100 (an ISG Talisman K-90XL or other make and manufacturer) is used to capture a thermal image of the environment to be augmented. The position and orientation of the thermal imaging camera 100 is collected by an InterSense IS-900 wireless tracking system 101 shown mounted on the thermal imaging camera 100 via mounting plate 102. (NOTE: Since the thermal imaging camera is an actual working device, the tracking devices 101 can be easily removed so that the thermal imaging camera can be used for real emergency incidents and other training.) As shown in FIG. 6, the IS-900 wireless tracking system consists of an IS-900 tracking station 110 and an IS-900 wireless tracking module 130. The thermal image acquired by the thermal imaging camera 100 travels over NTSC video to a wireless video transmitter 120 (which may or may not be located inside the thermal viewer, depending on the design), which sends the image via radio to a receiver module 140. The video is then wirelessly transmitted over NTSC video to a video capture device 160 connected to a computer 170. The position and orientation of the thermal imaging camera 100 are processed by an IS-900 base station 150, and connected to the computer 170. The computer 170 then takes the known position and orientation of the camera 100, computes and renders a simulated thermal image for fire and smoke, and renders a completed, combined scene 180. Next the scene 180 is transmitted via wireless transmitter 140 to the wireless receiver 141 (which may or may not be located inside the thermal viewer, depending on the design) as an NTSC signal, and finally the wireless receiver 141 sends the scene to the screen 190 for final display to the user.

Figure 7:
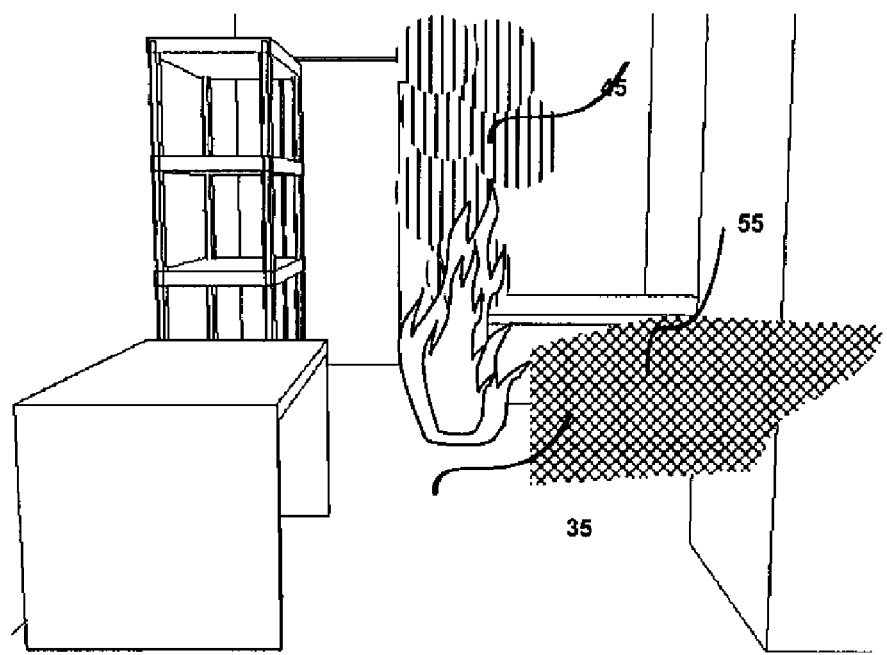
FIG. 7 schematically depicts a view of the environment (as captured by a standard visible camera) that has been modified to represent a thermal image with simulated fire, smoke, and extinguishing agent superimposed onto the simulated thermal view.

FIG. 7 shows an imaging-based training system utilizing a simulated thermal view of the environment. This system renders fire and smoke in the same fashion as the apparatus in FIGS. 1–4, but, for cost savings, utilizes a standard visible camera (not shown) instead of the thermal camera 100 to capture the view of the environment. This visible image is then processed with an algorithm to output an image that provides a similar appearance to that of a normal interior space as viewed through a thermal imaging camera. The fire 35 and smoke 45 are then superimposed. The result is an approximation of the same view that a trainee would receive through a thermal imager, but with substantially lower cost and easier implementation. This view can be considered adequate for many training scenarios, especially since the hotspots of significance are the fire, smoke, and other environmental hotspots, which the computer software adds to the image. Thus, the majority of the important heat-related aspects of the scene are correctly portrayed. The view in FIG. 7 also includes simulated extinguishing agent 55, which would be dark in color (cold) on a thermal imager.

Another preferred embodiment of the invention would be to instrument an actual firefighter's SCBA which already contains a thermal imaging device. A mounting device could be attached to the SCBA helmet for easy removal of the tracking sensor when the SCBA needs to be used for an actual incident (rather than a training exercise).

Additionally, the device can be used as a wired unit instead of wireless. In this situation, the wireless devices would be replaced by appropriate, direct-connected cables.

The invention could be used to visualize simulated thermal signatures of many different types of features in the environment, and could be used for a number of purposes, including firefighting, first response, military, law enforcement, and surveillance training.

In the case of firefighting, thermal signatures could be injected into the environment to train for almost any thermally detectable hazard scenario, including those of victims, hot spots, fire, smoke, steam, gases, extinguishing agents, other first responders and personnel, signals of impending structural failure, and explosion hazards (such as munitions or chemical drums).

Military, law enforcement, and surveillance applications might include thermal signatures of equipment, structures, vehicles (including recently operated vehicles warm spots, for example on the hood due to residual engine warmth), personnel, and indications of activity (such as footprints, vehicle tire or tread markings, disturbances in vegetation). These thermal signatures can be included for the purposes of training in these scenarios, as well as operationally for the evaluation of thermal stealth designs (such as alternate exhaust exit configurations and camouflage) in the field without having to construct a complete physical prototype to be evaluated.

Any tracking system can be used to track a thermal or visible camera, including InterSense IS-900 ultrasonic/inertial trackers, optical trackers such as InterSense IS-1200 or $3^{rd}$ Tech Hi Ball, GPS-based trackers, markerless trackers, or motorized camera mount trackers.

Another preferred embodiment is where the camera and tracking system are one unit in the form of a motorized camera system (which can be wireless or tethered to the rest of the invention equipment). In this scenario, the motorized base changes the orientation of the camera, and at the same time is capable of determining the resulting orientation of the camera at any time. This orientation information combined with the knowledge of the location of the base of the camera provides the full 6-degree of freedom orientation and position information required by the computer.

Another preferred embodiment is where the user carries the most or all of the equipment, included the computer and associated equipment, such as wireless receiver and tracking system. This permits the user and equipment to be self-contained.

What is claimed is:

1. A method for using thermal imaging and augmented reality, comprising
   providing a thermal imaging device to acquire an image of the user's environment;
   providing a tracking system mechanically coupled to the device;
   using the tracking system to collect the position and orientation of the device;
   providing a computer;
   using the device to capture a thermal view of the environment to be augmented;
   sending the view to a video capture device connected to the computer;
   using the computer to compute and render a simulated thermal image of objects and features to be augmented onto the thermal view of the environment;
   combining the simulated thermal image of the objects and features with the thermal image of the real world to display a single, augmented view to the user that represents an augmented thermal view of the real world;
   displaying the single, final, augmented thermal view to the user.

2. The method of claim 1 where the device used to capture the image of the real world is a portable thermal imaging camera.

3. The method of claim 2 where the portable imaging camera is an ISG Talisman K-90XL.

4. The method of claim 2 where the portable thermal imaging camera is an ISG K-1000.

5. The method of claim 2 where the thermal imaging camera is any model of portable thermal imaging camera from any other vendor.

6. The method of claim 1 where the device used to capture the image of the real world is a thermal imaging device attached to a firefighter's SCBA.

7. The method of claim 1 where the tracking system is ultrasonic/inertial.

8. The method of claim 1 where the tracking system is optical.

9. The method of claim 1 where the tracking system is comprised of GPS-based trackers.

10. The method of claim 1 where the tracking system is comprised of markerless trackers.

11. The method of claim 1 where the tracking system is comprised of motorized camera mount trackers.

12. The method of claim 1 where the single, augmented view is used for training.

13. The method of claim 1 where the single, augmented view comprises thermal signatures of at least one of victims, hot spots, fire, smoke, steam, gases, extinguishing agents, other first responders and personnel, signals of impending structural failure, and explosion hazards.

14. The method of claim 13 where the single, augmented view is used for training firefighters and other first responders for almost any thermally detectable hazard scenario.

15. The method of claim 1 where the objects and features are selected from the group of thermal signatures consisting of thermal signatures of equipment, structures, vehicles, personnel, and indications of activity, victims, hot spots, fire, smoke, steam, gases, extinguishing agents, other first responders and personnel, signals of impending structural failure, and explosion hazards.

16. The method of claim 15 where the single, augmented view is used for training military personnel.

17. The method of claim 15 where the single, augmented view is used for training law enforcement personnel.

18. The method of claim 15 where the single, augmented view is used for training surveillance personnel.

19. The method of claim 15 where the purpose is training for the evaluation of thermal stealth designs in the field.

20. The method of claim 15 where the purpose is the operational evaluation of thermal stealth designs in the field.

21. The method of claim 1 where the tracking system is a subcomponent of a motorized camera base such that the motorized camera has knowledge of the orientation of where the camera is pointing at any given time, and it can provide the orientation information of the camera to the computer.

22. The method of claim 1 where the thermal view that is sent from the imaging device to the video capture device is sent via a wireless transmitter and received by a wireless receiver.

23. The method of claim 1 where the tracking system attached to the device is a wireless device, or minimally, does not require any cables to be run from the tracking system to any fixed location.

24. The method of claim 1 where at least the computer is carried by the user.

* * * * *